United States Patent [19]

Ewers et al.

[11] Patent Number: 4,811,804
[45] Date of Patent: Mar. 14, 1989

[54] FIRE TRUCK WITH REAR-MOUNTED ENGINE

[75] Inventors: Ronald L. Ewers; William F. McCombs, Ocala, both of Fla.

[73] Assignee: Emergency One, Inc., Ocala, Fla.

[21] Appl. No.: 939,070

[22] Filed: Dec. 8, 1986

[51] Int. Cl.$^4$ ............................................. B60K 17/28
[52] U.S. Cl. .................................... 180/53.8; 169/24; 74/665 GC
[58] Field of Search ................... 180/53.1, 53.8, 54.1, 180/243, 247, 305, 70.1; 169/24; 74/665 GA, 15.8, 15.88, 665 T, 321, 467; 280/4

[56] References Cited

U.S. PATENT DOCUMENTS

| | | | |
|---|---|---|---|
| 1,463,569 | 7/1923 | Bathrick | 169/24 |
| 2,132,450 | 10/1938 | Wolf | 180/70.1 |
| 3,051,256 | 8/1962 | Brandt | 180/70.1 |
| 3,065,811 | 11/1962 | Parrett | 180/70.1 |
| 3,083,790 | 4/1963 | McAffee et al. | 74/665 GA |
| 3,167,147 | 1/1965 | Symons et al. | 180/70.1 |
| 3,198,276 | 8/1965 | Gordon | 180/70.1 |
| 3,580,350 | 5/1971 | Arkus | 180/70.1 |
| 4,036,508 | 7/1977 | Eddy et al. | 180/53.1 |
| 4,341,282 | 7/1982 | Bird | 181/70.1 |

Primary Examiner—Charles A. Marmor
Assistant Examiner—Karin Ferriter
Attorney, Agent, or Firm—Beaman & Beaman

[57] ABSTRACT

A fire truck characterized by its reduced operating noise level and improved drive train includes a frame having front and rear regions. An occupant cab is mounted upon the frame front region, and the engine is located at the rear region having a transmission associated therewith. A gear box mounted upon the frame intermediate the front and rear regions includes a close coupled fire pump attached thereto and the gear box includes an input shaft directly connected to the engine transmission. An output shaft of the gear box is directly connected to the differential associated with the vehicle rear wheels, and shifting means within the gear box selectively connects the engine and transmission to the differential or the fire pump. The fire pump gear box eliminates an intermediary transfer case and provides significant cost and weight advantages as well as eliminating the need for special power transmitting components.

4 Claims, 2 Drawing Sheets

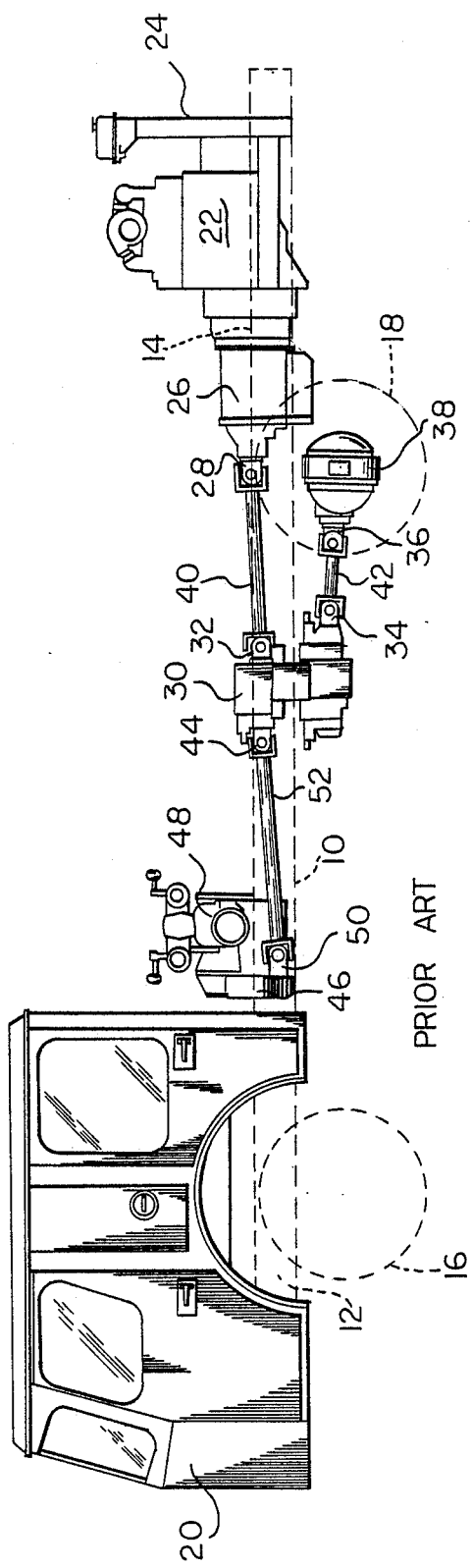
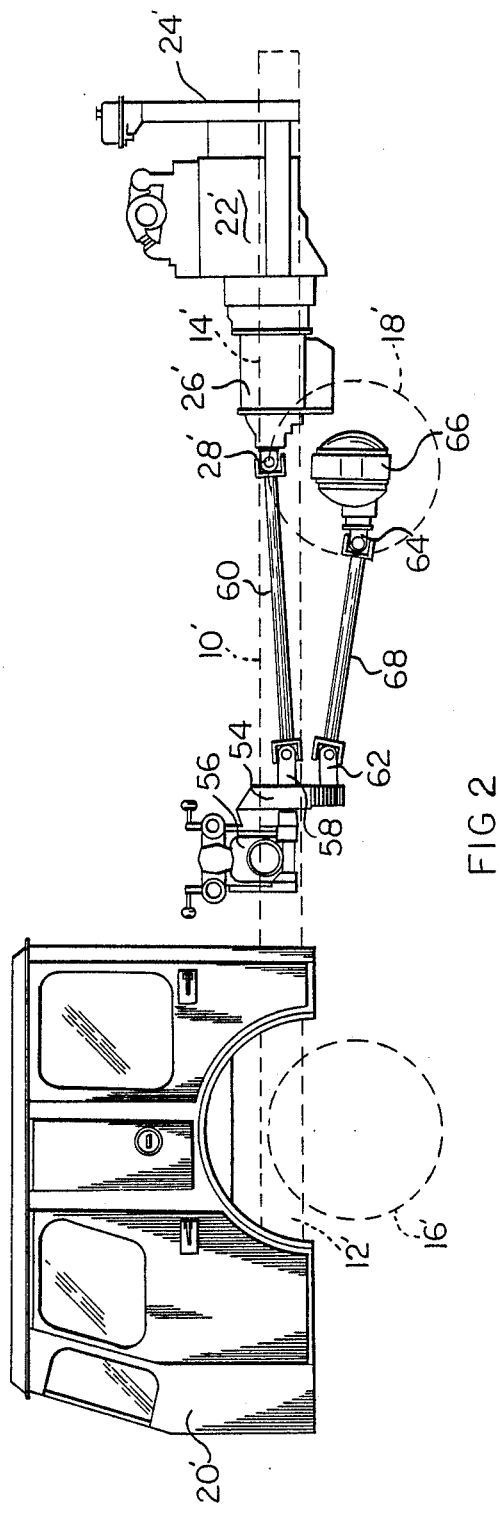

FIRE TRUCK WITH REAR-MOUNTED ENGINE

BACKGROUND OF THE INVENTION

Conventional fire truck design locates the driver and occupant cab at the frame front region and the engine and transmission are located adjacent or within the cab. The engine transmission is usually connected by a drive shaft to the front of a fire pump gear box and the rear output of the pump gear box is connected to the differential driving the rear axle and wheels. The fire pump gear box functions as a split-shaft power takeoff and includes shifting means wherein the power from the engine is selectively used to drive the fire pump connected to the gear box or drive the vehicle rear wheels.

This type of conventional fire truck arrangement locates the engine in the cab area producing considerable noise and heat adjacent the occupied cab having a detrimental effect upon firemen riding in the vehicle and noise levels often exceed those considered to be safe.

To overcome these problems the assignee of the present invention has successfully lowered the cab noise and temperature levels by remotely locating the engine and transmission adjacent the vehicle rear wheels. The vehicle radiator, engine and transmission are located rearwardly of the rear wheels and reversed with respect to conventional installations wherein the output shaft of the transmission extends forwardly and is connected to a drive shaft driving the top part of a transfer case located intermediate the vehicle front and rear wheels. The drive shaft in the transfer case selectively connects to a drive shaft located in a fire pump gear box mounted upon the vehicle frame forwardly of the transfer case and rearwardly of the cab. The fire pump is close coupled to the gear box.

The transfer case includes a lower portion connected to the upper shaft by selectively operated gear means and the lower portion of the transfer case includes an output shaft which extends rearwardly and is connected to the vehicle rear wheels differential by a drive shaft system.

While this arrangement of the power train components locates the engine remotely from the cab and removes the noise and heat from the cab area, the use of the transfer case, and the need for three primary drive train shafts, substantially adds to the cost and weight of the fire truck power drive system, and also requires that the fire pump be mounted higher in relation to the vehicle frame rails than the standard pump mounting arrangement.

It is an object of the invention to provide a fire truck arrangement having a forward-located cab and a rear-mounted engine and transmission wherein the need for an intermediary transfer case for selectively driving the vehicle rear wheels or the fire pump is eliminated.

Another object of the invention is to provide a rear engine fire truck having a simplified drive train arrangement wherein the drive train includes a fire pump gear box located forwardly of the vehicle rear wheels and is directly connected to the engine transmission, the fire pump gear box further including an output shaft directly connected to the differential for the rear wheels.

Yet another object of the invention is to provide a fire truck arrangement having a rear-mounted engine and transmission wherein a fire pump gear box located intermediate the vehicle front and rear wheels is close coupled to a fire pump and includes an input shaft directly connected to the engine transmission and an output shaft directly connected to the vehicle rear wheels differential, the gear box including shifting structure whereby power from the engine may be selectively transferred to the fire pump or the vehicle rear wheels.

Yet another object of the invention is to provide a fire pump gear box for use with a rear-drive fire truck wherein a fire pump is close coupled and mounted upon the gear box and the gear box includes an input shaft directly connected to the engine transmission and an output shaft directly connected to the vehicle differential and drive wheels, and power train selecting means within the gear box selectively drives the fire pump or rear wheels.

In the practice of the invention a fire truck includes an elongated frame basically consisting of a pair of spaced parallel elements having a front region, a rear region and a central region therebetween. The vehicle front steerable wheels are mounted upon the frame front region while the drive wheels are located at the rear region and are mounted upon axles driven through a conventional differential. A cab is located upon the frame front region including the drivers' conventional apparatus such as steering wheel, gear shift, brake operator, clutch, instruments, and the like. The cab also includes seats and compartments wherein the firemen ride, and the cab may be mounted substantially over the steering wheels extending forwardly and rearwardly thereof.

The engine is mounted upon the rear portion of the frame behind the rear wheels, and the engine is closely connected to a conventional transmission having an output shaft which extends toward the frame front region. The engine and transmission are of conventional construction, but are mounted on the frame in a "backward" manner as compared to a conventional installation.

A fire pump gear box is mounted on the frame intermediate the front and rear regions and intermediate the front and rear wheels. The gear box includes an input shaft extending rearwardly toward the engine transmission and is connected to the transmission output shaft by an elongated drive shaft and universal joint assembly. The gear box also includes a rearwardly extending output shaft located below the gear box input shaft and the gear box output shaft extends rearwardly toward the differential for the rear wheels and is connected thereto by a second elongated drive shaft and universal joint assembly.

A water pump, herein referred to as the fire pump, is closely coupled to the fire pump gear box and the gear box includes a fire pump drive shaft located above the gear box input shaft constituting an extension of the pump impeller. Internally, the gear box input shaft is splined and a drive gear is keyed thereon for selective axial displacement by a fork shifter wherein the drive gear may be shifted between a gear box output shaft drive position and a fire pump drive shaft drive position. The gear box output shaft includes a gear keyed thereto which meshes with the gear box input shaft drive gear when it is desired to drive the vehicle rear wheels, and the fire pump shaft includes a gear which meshes with the gear box input shaft drive gear when pumping is required. The gear box output shaft gear and fire pump shaft gear are radially misaligned wherein only one or the other may be in a driven relationship to the input shaft drive gear.

An idler lubricating gear is rotatably mounted upon the gear box output shaft for meshing with the input shaft drive gear when the drive gear is meshed with the fire pump drive gear. Lubricating oil within the gear box is transferred by the idler gear to the input shaft and pump drive gears and the bearings for the fire pump shaft eliminating the necessity for expensive lubrication pump apparatus.

As the fire pump gear box is directly connected to the engine transmission, and is also directly connected to the vehicle rear wheels differential, the fire pump gear box eliminates the necessity for an expensive transfer case intermediate the engine and fire pump gear box for transmitting power to the differential and the invention substantially reduces the weight of the vehicle drive train and the noise level thereof.

BRIEF DESCRIPTION OF THE DRAWINGS

The aforementioned objects of the invention will be appreciated from the following description and accompanying drawings wherein:

FIG. 1 is an elevational side view of a prior art rear-drive fire truck over which the invention is an improvement, FIG. 2 is an elevational side view of a fire truck incorporating the concepts of the invention.

DESCRIPTION OF THE PREFERRED EMBODIMENT

Figure 3:
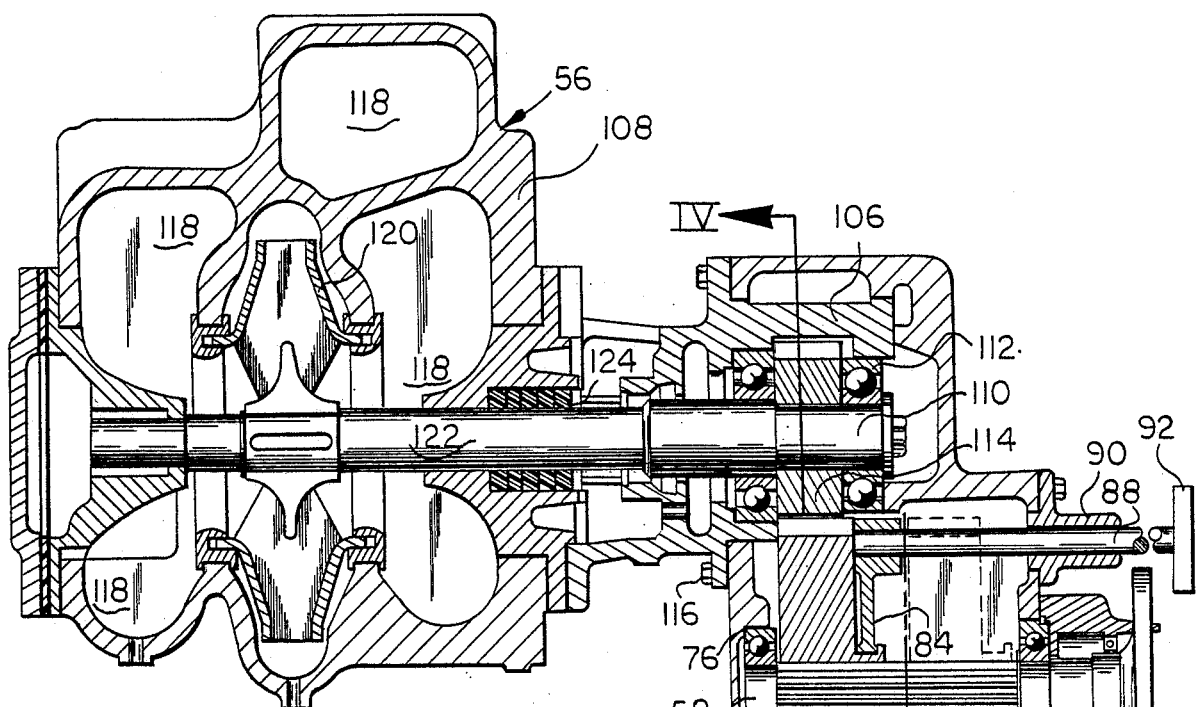
FIG. 3 is an enlarged, elevational, sectional view of a fire pump gear box in accord with the inventive concepts.

FIG. 1 illustrates a prior art fire truck arrangement developed by the assignee of the present invention over which the present invention is an improvement, and an understanding of this prior art arrangement will best permit an appreciation of the novel concepts of the invention.

With reference to FIG. 1, the fire truck vehicle includes a frame 10, shown in dotted lines, consisting of a pair of spaced parallel channel members, or the like, having a forward region 12 and a rear region 14. The vehicle front steerable wheels 16 are mounted upon the frame by conventional suspension structure, and likewise, the vehicle rear drive wheels 18 are mounted upon the rear axle, not shown, and conventional suspension structure is employed. A cab 20 is mounted upon the frame front region 12 above the front wheels extending fore and aft of the front wheels. The cab includes the fire truck driver apparatus, such as the steering wheel, gear shift mechanism, clutch, brake, instruments, etc. The cab also includes doors providing access to passenger compartments in which the firemen ride, and it is to be appreciated that the cab 20 is of a conventional form and constitutes no novel aspect with respect to the invention.

The basic power drive train components of the fire truck are illustrated in FIG. 1 behind the cab 20, and it will be appreciated that these components are normally hidden from view in that the fire truck includes extensive superstructure mounted upon the frame 10 between the cab and the rearmost frame portion. This superstructure includes panels, lockers, hose storage apparatus, ladder storage, water tanks, plumbing fixtures, and other known fire truck accessories. In that an understanding of the invention only requires an appreciation of the location of the basic power train components the aforementioned conventional fire truck apparatus is not shown for purpose of illustration.

An internal combustion engine 22 is mounted upon the frame rear region 14 intermediate the frame elements, and the engine includes a radiator 24 and is located behind the rear drive wheels 18. A conventional transmission 26 is closely coupled to the engine 22 and includes an output shaft 28 extending forwardly toward the cab 20. A transfer case 30 is mounted upon the frame 10 intermediate the forward and rear regions 12 and 14, and the transfer case includes an upper portion having a shaft 32, and the transfer case lower portion includes a rearwardly extending output shaft 34 which is substantially in alignment with the input shaft 36 of the rear wheel differential 38. An elongated power train shaft and universal joint assembly 40 interconnects the transmission output shaft 28 with the transfer case shaft 32, while a second power train shaft and universal joint assembly 42 interconnects the transfer case lower shaft 34 and the differential shaft 36. The transfer case 30 also includes an output shaft 44 extending forwardly toward the fire pump gear box 46 mounted upon the frame 10 behind the cab 20 and the gear box is closely coupled to the fire pump 48. The gear box includes an input shaft 50 which is connected to the upper transfer case shaft 44 by the third power train shaft and universal joint assembly 52.

The transfer case 30 includes shiftable gear structure whereby input power into shaft 32 may be selectively transferred to power train shaft assembly 42 and differential 38 for producing vehicle movement, or the power may be transferred from the engine to the gear box shaft 50 through power train shaft assembly 52 for pumping.

As the prior art power train arrangement of FIG. 1 locates the engine 22 at the rear of the vehicle the noise and heat level within the cab 20 is substantially reduced as compared with conventional fire truck arrangements wherein the engine and transmission are located adjacent the cab and steerable wheels. However, the arrangement of FIG. 1 requires the presence of the expensive transfer case 30, three power train drive shafts and universal joint assemblies 40, 42 and 52 must be used, and as the transfer case 30 reverses the direction of rotation of power from the transmission 26 it is necessary to utilize a co-side loaded rear axle and differential 38 at the rear wheels. Also, the arrangement of FIG. 1 requires that the fire pump 48 and engine 22 be mounted relatively high with respect to the frame 10 in order to accommodate the drive train angles of the drive shafts and universal joint assemblies which raises the center of gravity of the fire truck. Additionally, gear noise is generated at the transfer case which adds to the noise level of the vehicle operation.

The basic inventive concepts of the invention will be appreciated from the following description of FIG. 2. In FIG. 2 the components identical to those previously described are indicated by primed reference numerals and as will be noted, the frame 10', wheels 16' and 18', cab 20', engine 22' and transmission 26' are identical to the prior art embodiment of FIG. 1. However, in accord with the invention, the transfer case 30 is eliminated and the drive train of the vehicle substantially simplified.

As will be appreciated from FIG. 2, a fire pump gear box 54 is mounted upon the frame 10' intermediate the frame front and rear regions, and behind the cab 20', and the fire pump 56 is closely coupled and connected to the gear box 54. The gear box includes an input shaft 58 which is directly connected to the transmission output shaft 28' by a power train shaft and universal joint assembly 60. Further, the fire pump gear box includes an output shaft 62 located below the input shaft 58 and extending rearwardly toward the differential input shaft 64 of differential 66, and is connected to the differential input shaft by the power train shaft and universal joint assembly 68.

Figure 4:
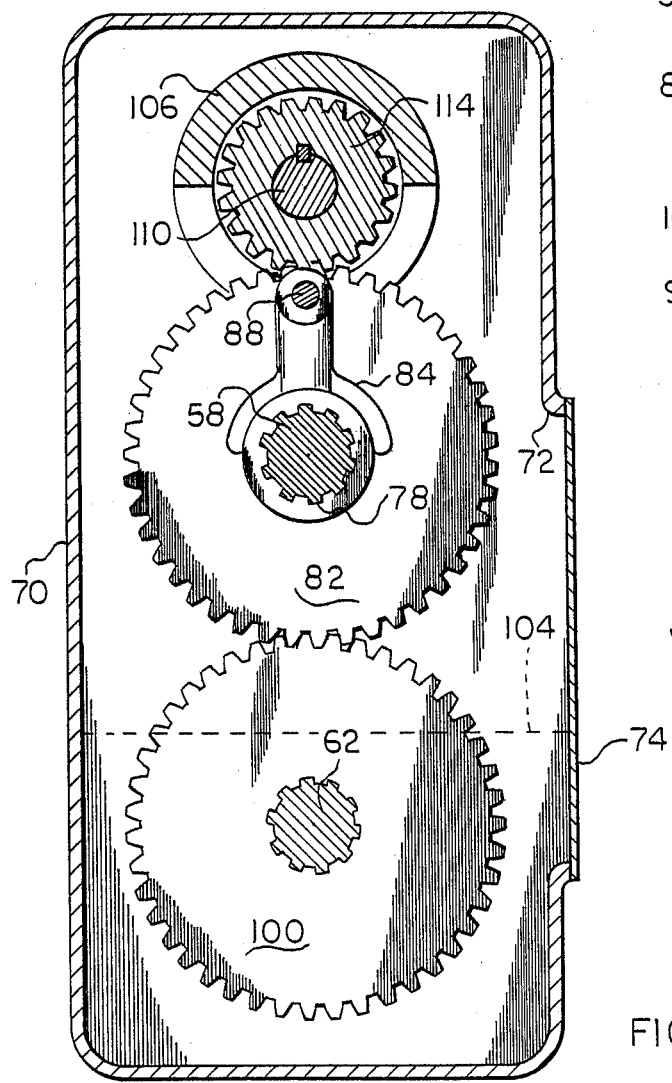
FIG. 4 is an elevational, sectional view as taken along Section IV—IV of FIG. 3.

The fire pump gear box 54 is of a unique construction and is best appreciated from FIGS. 3 and 4. The fire pump gear box includes a housing 70 having a generally rectangular configuration, FIG. 4, and an access opening 72 is closed by plate 74 which is bolted to the housing. The housing 70 rotatably supports input shaft 58 upon bearings 76, and the input shaft is splined at 78 and is externally provided with the adapter plate 80 for connection to the power drive shaft and universal joint assembly 60. A drive gear 82 is keyed upon the input shaft 58 by the splines 78 and is axially positionable upon shaft 58 by shifting apparatus which includes a fork 84 located within the drive gear hub groove 86. The fork 84 is mounted upon shifter rod 88 longitudinally supported within housing 70 by guide 90. Longitudinal shifting of the rod 88 may be manual, or may be operated by an air cylinder, electrical actuator, hydraulic worm gear drive or a mechanical linkage, as is well known in the art. The rod actuator is schematically illustrated at 92.

The fire pump gear box output shaft 62 is located parallel to and below the input shaft 58 and is rotatably supported within bearings 94, and, externally, the output shaft includes adapter plate 96 for connection to the power train shaft and universal joint assembly 68. A gear 98 is keyed to the shaft 62 by splines and the gear 98 will mesh with the input shaft drive gear 82 when the drive gear is in the dotted-line position shown in FIG. 3 wherein the drive gear 82 has been shifted to the right.

An idler gear 100 is rotatably mounted upon a cylindrical surface 102 on the output shaft 62 and meshes with the drive gear 82 when the drive gear is in the full-line position shown in FIG. 3 for driving the fire pump. The housing 70 defines a sump for lubricating oil, and lubricating oil is located within the lower regions of the housing of a level 104 usually above that of output shaft 62. Thus, the idler gear 100 will be located within the lubricating oil and will transfer the oil to the drive gear 82 which, in turn, will lubricate the upper regions of the gear box during pumping.

In its upper region the gear box 54 receives the extension 106 of the pump casing 108 which contains the fire pump drive shaft 110 rotatably supported within bearings 112. A gear 114 is keyed to the shaft 110 and meshes with the input drive gear 82 when the gear 82 is in the full-line position of FIG. 3. When the pump drive shaft 110 is being driven by the gear 82 the lubricating oil being transferred to gear 82 by idler gear 100 will lubricate the gear 114 and the bearings 112, and the idler gear eliminates the necessity for a separate lubricating pump.

The fire pump casing 108 is mounted upon the gear box 54 by the extension 106 received within the gear box and is bolted thereon by bolts 116. The fire pump casing 108 includes flow channels 118 defined therein, and the impeller 120 is keyed upon the impeller shaft 122 which constitutes an extension of the drive shaft 110. The fire pump includes the usual inlet and outlet ports, and valve structure associated therewith, not shown, and packing 124 will seal the pump against fluid leakage. The illustrated pump is a commercial embodiment of one type of pump used by the assignee, a Model QSMG pump manufactured by Hale Fire Pump Co. of Conshohocken, Pa.

When the drive gear 82 is in the full-line position of FIG. 3, the engine 22' and transmission 26' will be directly connected to the pump 56, and maximum pumping efficiency is directly achieved. During pumping, the vehicle is incapable of being power driven in that the gear 82 is out of mesh with the output gear 98.

Upon shifting of the rod 88 to the right to locate the drive gear 82 at its dotted-line position of FIG. 3, the drive gear 82 will mesh with the gear box gear 98 and drive the output shaft 62 and the vehicle differential 66, and as this positioning of the gear 82 disconnects the fire pump drive shaft 110 from the gear 82, pumping ceases during vehicle movement. It will therefore be appreciated that the inventive concepts of the invention permit the fire pump gear box 54 to function as a combination transfer case between the engine 22' and rear wheel differential 66 and the pump 56, and simultaneously, the gear box serves as a support and close coupled connection to the pump.

The apparatus of FIG. 2, as compared to the prior art arrangement of FIG. 1, utilizes significant savings in the order of several thousands of dollars with respect to material and labor costs in that the transfer case 30 of FIG. 1 is eliminated. Additionally, approximately 500 pounds of weight are removed from the vehicle and the drive line gear noise is reduced by approximately 50%. The practice of the invention eliminates the need for special co-side loaded rear axles and differentials in that the proper direction of rotation of the power line shaft and universal joint assembly 68 is produced as compared to that produced with the arrangement of FIG. 1. Further, the pump 56 may be located in the normal position, i.e. lower with respect to the frame 10' allowing greater pump panel room for gauges, eliminating special plumbing adapters, and lowering the center of gravity of the vehicle. Further, the invention simplifies much of the plumbing and allows the engine, transmission and vehicle water tank to be mounted lower with respect to the frame and provides more room to mount fuel tanks on short wheel base vehicles. The invention also provides other advantages with respect to the cab mounting, frame construction and the use of lower cost power train components.

It is appreciated that various modifications to the inventive concepts may be apparent to those skilled in the art without departing from the spirit and scope of the invention.

We claim:

1. A fire truck comprising, in combination, an elongated frame having a front region and a rear region, a passenger cab mounted on said frame front region, steerable wheels mounted on said frame front region, drive wheels mounted on said frame rear region, a differential drivingly associated with said drive wheels having an input shaft extending toward said frame front region, an engine mounted on said frame rear region, a transmission mounted on said frame rear region operatively connected to said engine and having an output shaft extending toward said frame front region, a fire pump drive gear box mounted on said frame forwardly of said drive wheels and said differential and having a front side facing said frame front region and a rear side facing said frame rear region and including an input shaft extending rearwardly toward said transmission having an adapter adjacent said gear box rear side, an output shaft extending rearwardly toward said differential having an adapter adjacent said gear box rear side and a fire pump drive shaft, shiftable power drive means selectively connecting said gear box input shaft to said gear box output shaft and directly to said fire pump drive shaft, a fire pump mounted on said gear box extending from said drive gear box front side and having an impeller in driven relationship to said fire pump drive shaft, a first power train shaft having a first end connected to said transmission output shaft and a second end connected to said gear box input shaft adapter, and a second power train shaft having a first end connected to said gear box output shaft adapter and a second end connected to said differential input shaft whereby said gear box shiftable power drive means selectively connects said engine and transmission to said differential or said fire pump.

2. A fire truck comprising, in combination, an elongated frame having a front region and a rear region, a passenger cab mounted on said frame front region, steerable wheels mounted on said frame front region, drive wheels mounted on said frame rear region, a differential drivingly associated with said drive wheels having an input shaft extending toward said frame front region, an engine mounted on said frame rear region, a transmission mounted on said frame rear region operatively connected to said engine and having an output shaft extending toward said frame front region, a fire pump drive gear box mounted on said frame forwardly of said drive wheels and said differential having an input shaft extending rearwardly toward said transmission, an output shaft extending rearwardly toward said differential and a fire pump drive shaft, shiftable power drive means selectively connecting said gear box input shaft to said gear box output shaft and said fire pump drive shaft, a fire pump mounted on said gear box having an impeller in driven relationship to said fire pump drive shaft, a first power train shaft having a first end connected to said transmission output shaft and a second end connected to said gear box input shaft, and a second power train shaft having a first end connected to said gear box output shaft and a second end connected to said differential input shaft, bearing means within said fire pump drive gear box rotatably supporting said gear box input shaft, output shaft and fire pump drive shaft in spaced parallel relationship, said shiftable power drive means including a first gear mounted on said gear box input shaft and keyed thereto axially shiftable between first and second operative positions, gear shifting means operatively associated with said first gear for shifting said first gear between operative positions, a second gear keyed to said gear box output shaft, said first gear meshing with said second gear at said first gear first position to drivingly connect said gear box input and output shafts, and a third gear keyed to said gear box fire pump drive shaft, said first gear meshing with said third gear at said first gear second position to drivingly connect said gear box input shaft and said fire pump drive shaft and disconnect said gear box input and output shafts whereby said gear box shiftable power drive means selectively connects said engine and transmission to said differential or said fire pump.

3. In a fire truck as in claim 2, said gear shifting means including an annular groove defined on said first gear, a yoke received within said groove, and a rod axially reciprocally mounted within said gear box for movement substantially parallel to said gear box input shaft supporting said yoke.

4. In a fire truck as in claim 2, said fire pump drive gear box having a lower region defining a lubricating oil sump, lubricating oil within said sump, said gear box output shaft being located within said lower region, said gear box input shaft being located above said output shaft and said fire pump drive shaft being located above said input shaft, an idler gear rotatably mounted upon said gear box output shaft at least partially emersed within said lubricating oil, said idler gear meshing with said first gear when said first gear is located at its said second position whereby said idler gear conveys oil to said first gear and said third gear when said fire pump drive shaft is being driven.

* * * * *